United States Patent [19]

Boucher et al.

[11] Patent Number: 5,427,478

[45] Date of Patent: Jun. 27, 1995

[54] BOWLING BALL DRILLING APPARATUS

[75] Inventors: John N. Boucher, 110 Coveridge La., Longwood, Fla. 32750; David E. Bajune, Sanford, Fla.

[73] Assignee: John N. Boucher, Longwood, Fla.

[21] Appl. No.: 129,750

[22] Filed: Sep. 30, 1993

[51] Int. Cl.⁶ .............................................. B23B 41/00
[52] U.S. Cl. .......................................... 408/90; 269/71; 408/91; 408/105; 408/DIG. 1
[58] Field of Search ...................... 408/89, 90, 91, 104, 408/105, 107, DIG. 1; 409/198, 224; 269/71, 73

[56] References Cited

U.S. PATENT DOCUMENTS

| | | | |
|---|---|---|---|
| 2,490,120 | 12/1949 | Ellison et al. | 408/DIG. 1 |
| 2,564,566 | 8/1951 | Duffy | 269/71 |
| 2,879,679 | 3/1959 | Neff | 269/71 |
| 3,095,767 | 7/1963 | Jesonis . | |
| 3,143,901 | 8/1964 | Bawtinheimer . | |
| 3,232,141 | 2/1966 | Swanson et al. | 408/90 |
| 3,263,531 | 8/1966 | Sammons et al. . | |
| 3,329,043 | 7/1967 | Stanford . | |
| 3,415,146 | 12/1968 | Schroeder, Jr. . | |
| 3,465,619 | 9/1969 | Blaker et al. . | |
| 3,521,506 | 7/1970 | DiNardo . | |
| 3,689,165 | 9/1972 | Small | 408/3 |
| 3,826,584 | 7/1974 | Mengerhausen | 408/89 |
| 4,502,457 | 3/1985 | Marron | 269/71 |

*Primary Examiner*—Daniel W. Howell
*Attorney, Agent, or Firm*—Allen, Dyer, Doppelt, Franjola & Milbrath

[57] ABSTRACT

An apparatus for positioning a bowling ball during a drilling process and method that provides reproducible orientations of the ball for accurately modifying and repeating the drilling process is described. The apparatus affixed a bowling ball while exposing a sufficient portion of a surface of the ball where middle finger, ring finger and thumb holes are to be drilled. The apparatus positions the bowling ball for drilling holes of varying pitch without requiring the ball to be removed from its rigidly affixed position within the apparatus. Holes having severe pitches are easily drilled and reproduced, including oval holes having preselected oval rotations. A computer program converts inputted hand measurements to digitized apparatus movements for positioning the ball prior to drilling a desired hole. Digital encoders indicate apparatus movement that is matched with computer output for ease and repeatability in drilling a ball.

8 Claims, 7 Drawing Sheets

| *RIGHT-HAND BOWLER* | | |
|---|---|---|
| *MIDDLE FINGER GENERAL DATA* | | |
| GIVEN INFORMATION | | |
| | BALL DIAMETER | ⎫ |
| | BRIDGE DISTANCE (EDGE-TO-EDGE) | ⎪ |
| | MIDDLE FINGER HOLE DIAMETER | ⎬ COPIED FROM MEASUREMENT DATA INPUT-PROGRAM INPUT |
| | MIDDLE FINGER LATERAL PITCH | ⎪ |
| | MIDDLE FINGER FORE/AFT PITCH | ⎪ |
| | THUMB/MIDDLE FINGER SPAN EDGE-TO-EDGE | ⎭ |
| *RIGHT-HAND BOWLER* | | |
| *MIDDLE FINGER GENERAL CALCULATIONS* | | |
| | BALL RADIUS | BALL DIAMETER/2 |
| | LENGTH OF ARC (FINGER-TO-FINGER) | ((MIDDLE FINGER HOLE DIAMETER + RING FINGER HOLE DIAMETER)/2) + BRIDGE DISTANCE |
| | HALF-LENGTH OF ARC (MIDDLE TO CENTER) | [LENGTH OF ARC (FINGER TO FINGER)]1/2 |
| | MIDDLE FINGER HALF-SPAN ANGLE IN DEGREES | [(180/PI) X HALF-LENGTH OF ARC(MIDDLE FINGER TO BALL CENTER)]/BALL RADIUS |
| | MIDDLE FINGER HALF-SPAN ANGLE IN RADIDNS | [((180/PI) X HALF-LENGTH OF ARC (MIDDLE FINGER TO BALL CENTER))/BALL RADIUS]/(PI/180) |
| | LENGTH OF ARC (MIDDLE TO THUMB) | ((MIDDLE FINGER HOLE DIAMETER + THUMB HOLE DIAMETER)/2) + THUMB\MIDDLE FINGER SPAN EDGE-TO-EDGE |
| | CENTRAL LENGTH OF ARC | SQUARE ROOT OF ((LENGTH OF ARC (MIDDLE TO THUMB)] SQUARED-[HALF-LENGTH OF ARC (MIDDLE TO BALL CENTER)] SQUARED |
| | SPAN DEGREES (THUMB TO MIDDLE) | ARC-SINE OF [((HALF- LENGTH OF ARC (MIDDLE TO BALL CENTER))/(LENGTH OF ARC (MIDDLE TO THUMB))X(180/PI)] |
| | MODIFIED LENGTH OF ARC(MIDDLE TO RING) | HALF-LENGTH OF ARC (MIDDLE TO CENTER)+HALF-LENGTH OF ARC (RING TO CENTER) |

← FROM FIG. 8A

| | |
|---|---|
| RIGHT-HAND BOWLER <br> MIDDLE FINGER LEFT ROTATION | |
| MIDDLE-FINGER ROTATIONAL OFFSET <br><br> LR | ARC-TANGENT OF [(MIDDLE FINGER LATERAL PITCH/BALL RADIUS) X (180/PI)] <br><br> MIDDLE FINGER HALF-SPAN ANGLE IN DEGREES - MIDDLE FINGER ROTATIONAL OFFSET <br> (LEFT MACHINE ROTATIONAL MOVEMENT OUTPUT) |
| RIGHT-HAND BOWLER <br> MIDDLE FINGER RIGHT TABLE | |
| RT | (COSINE OF ((MIDDLE FINGER ROTATIONAL OFF-SET X (PI/180)) X MIDDLE FINGER LATERAL PITCH) X -1 <br> (RIGHT TABLE MACHINE LINEAR MOVEMENT OUTPUT) |
| RIGHT-HAND BOWLER <br> MIDDLE FINGER RIGHT ROTATION | |
| SPAN ANGLE IN DEGREES <br> HALF-SPAN ANGLE IN DEGREES <br> MIDDLE FINGER TO THUMB ROTATIONAL OFFSET <br><br> RR | ((180/PI) X CENTRAL LENGTH OF ARC)/BALL RADIUS <br> SPAN ANGLE IN DEGREES/2 <br> ARC-TANGENT OF (MIDDLE FINGER FORE-AFT PITCH/BALL RADIUS) X (180/PI) <br> HALF-SPAN ANGLE IN DEGREES + MIDDLE FINGER TO THUMB ROTATIONAL OFFSET <br> (RIGHT MACHINE ROTATIONAL MOVEMENT OUTPUT) |
| RIGHT-HAND BOWLER <br> MIDDLE FINGER LEFT TABLE | |
| LT | (COSINE OF ((MIDDLE FINGER TO THUMB ROTATIONAL OFF-SET X (PI/180)) X MIDDLE FINGER FORE-AFT PITCH) <br> (LEFT TABLE MACHINE LINEAR MOVEMENT OUTPUT) |

FIG-8B

BALL DRILLING ANALYSIS

RIGHT HAND BOWLER INFORMATION

CUSTOMER NAME: 8.5  TIME: 10:08 PM
BALL MODEL: 0  BALL SERIAL NUMBER: 0

INPUT DATA

| | | | |
|---|---|---|---|
| MIDDLE FINGER DIAMETER: | 0.9688 | THUM HOLE DIAMETER: | 1.1250 |
| MIDDLE FINGER LATERAL PITCH: | 0.4100 | LATERAL PITCH: | -1.0000 |
| MIDDLE FINGER PITCH: | 0.1250 | THUM PITCH: | -4.0000 |
| RING FINGER DIAMETER: | 0.9688 | BRIDGE DISTANCE | 0.1875 |
| RING FINGER LATERAL PITCH: | 0.6840 | THUMB-TO-MIDDLE FINGER: | 4.5000 |
| RING FINGER PITCH: | 0.1250 | THUMB-TO-RING FINGER: | 4.6250 |

BALL DIAMETER: 8.5000

CALCULATED DATA FOR BALL DRILLING (RIGHT-HAND BOWLER)

MIDDLE FINGER

| ROTATIONAL ⟶ 120 | | | LINEAR ⟶ 122 | |
|---|---|---|---|---|
| X(RR) | 38.87 | | X(RT) | -0.4081 |
| Y(LR) | 2.28 | | Y(LT) | 0.1249 |

RR DEGREES ( 38 DEGREES  52 MIN  14 SECONDS )
LR DEGREES ( 2 DEGREES  17 MIN  0 SECONDS )

RING FINGER

| ROTATIONAL ⟶ 120 | | | LINEAR ⟶ 122 | |
|---|---|---|---|---|
| X(RR) | 40.55 | | X(RT) | 0.6753 |
| Y(LR) | 1.17 | | Y(LT) | 0.1249 |

RR DEGREES (40 DEGREES  32 MIN  48 SECONDS )
LR DEGREES ( 1 DEGREES  10 MIN  23 SECONDS )

THUMB

| ROTATIONAL ⟶ 120 | | | LINEAR ⟶ 122 | |
|---|---|---|---|---|
| X(RR) | 6.08 | | X(RT) | -0.9734 |
| Y(LR) | -13.24 | | Y(LT) | 2.9128 |

RR DEGREES ( 6 DEGREES  4 MIN  41 SECONDS )
LR DEGREES ( -13 DEGREES  14 MIN  25 SECONDS )

FIG. 9

BOWLING BALL DRILLING APPARATUS

BACKGROUND OF INVENTION

1. Field of Invention

The invention relates to an apparatus for positioning a bowling ball during a drilling process and in particular to an apparatus and method that provides reproducible orientations of the ball for accurately modifying and repeating the drilling process.

2. Background Art

Bowling ball construction has become hi-tech over the last several years. Inner core designs generate varied amounts of hitting power, tailored tracking on a lane, and higher revolutions. Such ball improvements have placed increased demand on properly fitting a bowling ball to a bowler. Most bowlers must pay a cost of losing several pins dropped or frames lost every time they switch balls and acclimate themselves to a different feel. This difference in feel make the bowler reluctant to change balls even when a change is needed.

It is generally recognized by experienced bowlers that finger holes in a bowling ball play a critical role in providing the bowler with a proper feel for holding and releasing the bowling ball in a consistent manner. The control that a bowler has over a bowling ball is dependent on the placement, orientation, and cross-sectional configuration of the holes in the ball. As is generally the case in sports, a basic form is sought and typically found but it is the process of repeating and continuing to repeat this form under the multitude of conditions presented during competition, not least of which is achieving a feel that provides the confidence to score well. The fit of the ball is always under consideration.

It is also well known and accepted in the art of bowling ball drilling, that obtaining the basic measurements takes an experienced ball driller and if such measurements were to be drilled by different experienced drillers, the fit would be only similar. Variances and errors in bevel size, drilling spans and pitches would vary. Technique varies even with experienced drillers and typically it is a trial and error method that ultimately provides the bowler with a desired fit.

U.S. Pat. No. 3,263,531 discloses a bowling ball drill jig for drilling thumb and finger holes comprising a moveable apparatus for locating the center point of the hole to be drilled and selecting a desired plane for the axis of the hole to be drilled. Calibration means is employed to account for hole edges. The patent teaches the importance of being able to fix and hold the ball in a jig for greater drilling accuracy without having to move or remove the ball from the jig after each hole is drilled to allow proper measurement for drilling succeeding holes.

U.S. Pat. No. 3,521,506 discloses a method and apparatus for forming oblong holes of predetermined orientation in a bowling ball by superimposing a target with radial lines at predetermined angles, all radiating from a common center on a selected point on a line on the ball. The line is rotated on the ball into coincidence with one of the radial lines, making a round hole in the ball. The ball is then moved a predetermined distance along one of the radial lines and additional material is removed from the side wall of the hole opposite the direction of motion to make the hole oblong.

U.S. Pat. No. 3,095,767 discloses an apparatus and method for drilling holes in a bowling ball and reproducing the holes of a first bowling ball into a second bowling ball by positioning the first bowling ball into a cradle, positioning inserts in each finger hole and providing a guide rod for establishing a locking position for tool holders. The guide rod is removed; the second bowling ball is placed in position of the first; and holes drilled based on the guided selections.

In a manual for bowling pro shops and knowledgeable bowlers, "Fitting and Drilling a Bowling Ball" by Bill Taylor, the author points out the problems in properly fitting a bowler for drilling a bowling ball and even though it may be known what measurements are needed, accurately obtaining the measurements is not so simple. The author further points out that too many ill fitted balls result from inexperienced ball drillers. Twelve measurements are discussed for providing a proper fit which permits a proper swing and a proper release to maximize a bowler's chances for a satisfactory delivery. The author discloses methods for measuring a bowlers hand and fingers for obtaining a set of measurements that can satisfy the bowler's needs. However, the author points out that though there are many talented ball drillers, most of them become talented by trial and error and in doing so cause many problems in the course of their self education.

SUMMARY OF INVENTION

An apparatus for positioning a bowling ball for drilling thumb and finger holes in the bowling ball comprises a frame having an aperture for loosely receiving a bowling ball and means for rigidly affixing the bowling ball within the frame aperture for providing access to a hemisphere of the ball. Means are provided for rotating the frame, the rotation having three degrees of freedom of rotational movement. Means are also provided for communicating the rotating means with the frame. The apparatus further comprises means for mounting the apparatus to a table, the table having means for providing linear movement through three additional degrees of freedom.

In a preferred embodiment, the frame comprises a tube dimensioned to freely receive the bowling ball, the tube having a top edge and a bottom edge. A top plate is affixed to the tube top edge. The top plate has an aperture for loosely receiving the bowling ball. A bottom plate is affixed to the tube bottom edge. The bottom plate has an aperture for providing access to the bowling ball affixed within the frame.

It is an object of the invention to provide a computer assisted drilling system that insures duplication of a desired fit ball. Each bowling ball is drilled using a method for drilling the bowling ball comprising the steps of providing a frame for loosely receiving a bowling ball and rigidly affixing the bowling ball within the frame for exposing a hemisphere of the ball for drilling finger and thumb holes. Steps further include selecting a drill bit sized to meet a predetermined measurement and placing the bit in a chuck affixed proximate the frame for drilling the bowling ball. A reference point on the surface of the bowling ball is used for aligning the axis of the drill bit with the reference point. The frame is then rotated through a first arc about a first axis through the center of the ball and through a second arc about a second axis through the center of the ball. The rotating through the first and second arcs positions the drill bit above the surface of the ball proximate a surface entry point for drilling a hole. The frame is displaced along the first axis for positioning the drill bit for providing a hole having a lateral pitch and along the second axis for positioning the drill bit for providing a vertical pitch. A hole is drilled in the ball, the axis orientation of the hole resulting from the ball rotating and displacing steps. The aligning of the drill bit is repeated until a middle finger hole, a ring finger hole and a thumb hole have been drilled meeting a preselected set of measurements including bridge and span distances and including hole sizes and hole axis lateral and vertical pitches.

In a preferred method for drilling finger and thumb holes, steps comprise selecting a ball diameter, bridge and span measurements, the bridge measurement for defining a bridge surface distance between a middle finger hole and a ring finger hole, a first span measurement for defining a first span surface distance between a thumb hole and a middle finger hole and a second span measurement for defining a second span surface distance between a thumb hole and a ring finger hole. Diameters are selected for thumb and middle and ring finger holes. Lateral and vertical pitches are also selected for these holes. A drill bit sized to provide the selected middle finger hole diameter measurements selected. The bit is placed in a chuck affixed proximate the frame for drilling the bowling ball. The axis of the drill bit is aligned with a reference point on the ball. The frame is rotated for positioning the drill bit for drilling a hole in the ball, the positioning for providing a middle finger hole alignment having the selected middle finger lateral and vertical pitches. The frame is displaced for positioning the drill bit for providing a middle finger hole in a position communicating the span and bridge measurements and the middle finger hole is then drilled in the ball.

The process continues for positioning and drilling the ring finger and thumb holes. The invention permits locating and rotating oval holes. The method steps further comprise selecting an oval hole dimension having a minor diameter and a major diameter and selecting a drill bit sized to provide the minor diameter. An oval hole rotation can also be selected. The frame is rotated and displaced for positioning the drill bit for drilling a first hole having an axis corresponding to the axis of the oval. The first hole is drilled. The frame is then rotated and displaced for drilling a second hole, a portion of the second hole comprising a portion of the first hole, wherein the axis of the second hole is positioned for providing a second oval hole having the oval hole rotation. The frame is again rotated and displaced for drilling a third hole, a portion of the third hole comprising a portion of the first hole, wherein the axis of the third hole is positioned for providing the oval having the selected oval rotation, minor and major diameters.

In the preferred embodiment of the invention, computer aided controls are provided. The method further comprises operating a computer for determining rotation and displacement of the frame. The computer performs the steps of receiving thumb and finger hole measurements comprising hole diameter, lateral pitch, vertical pitch, bridge and span distances, oval dimensions, and ball diameter. An algorithm then converts the hole measurements to frame rotational and linear movements for orienting a drill bit over a portion of the bowling ball for drilling a selected hole having the received ball diameter. The algorithm digitizes the rotational and linear frame movements with respect to the reference point, for use in directing an operator in moving the frame. In the preferred embodiment, digital encoders communicating with the frame provide digitized readings responding to frame rotational and displacement movements. The frame is rotated until an encoder rotational value corresponding to a calculated computer digital value for the computer digitized movements is reached. Likewise, the frame is displaced until an encoder displacement value corresponding to a calculated computer digital value for the computer digitized movement is reached.

It is an object of the invention to provide a fixture and method for rigidly holding a bowling ball during the drilling process that has three rotational degrees of freedom while permitting access to a bowling ball hemisphere, the fixture securely positioning the bowling ball at a point of reference.

It is a further object of the invention to provide a method for precisely drilling and reproducing the precision drilling of a bowling ball to other balls by one having little skill in the art of drilling balls by repeating drilling steps. The drilling is to include a wide range of pitches not available from prior art devises and methods. In addition, it is an object to provide oval holes for thumbs and fingers at selected oval angles, and reproducing the oval angles for selected major and minor oval dimensions.

It is yet another object of the invention to provide a method for using finger measurements and providing rotational and linear measured movements of a bowling ball for drilling the ball. Further, it is an object to vary one measurement while fixing remaining measurements, such variation to provide a quantification of feel that can be incrementally adjusted.

BRIEF DESCRIPTION OF DRAWINGS

A preferred embodiment of the invention as well as alternate embodiments are described by way of example with reference to the accompanying drawings in which:

FIG. 8 is a chart diagramming the steps in a sample calculation of frame and table movements required to provide holes having a desired pitch;

FIG. 9 is a flow chart diagramming a process for drilling holes in a bowling ball using the preferred embodiment of the invention.

DETAILED DESCRIPTION OF PREFERRED EMBODIMENT

Figure 1A:
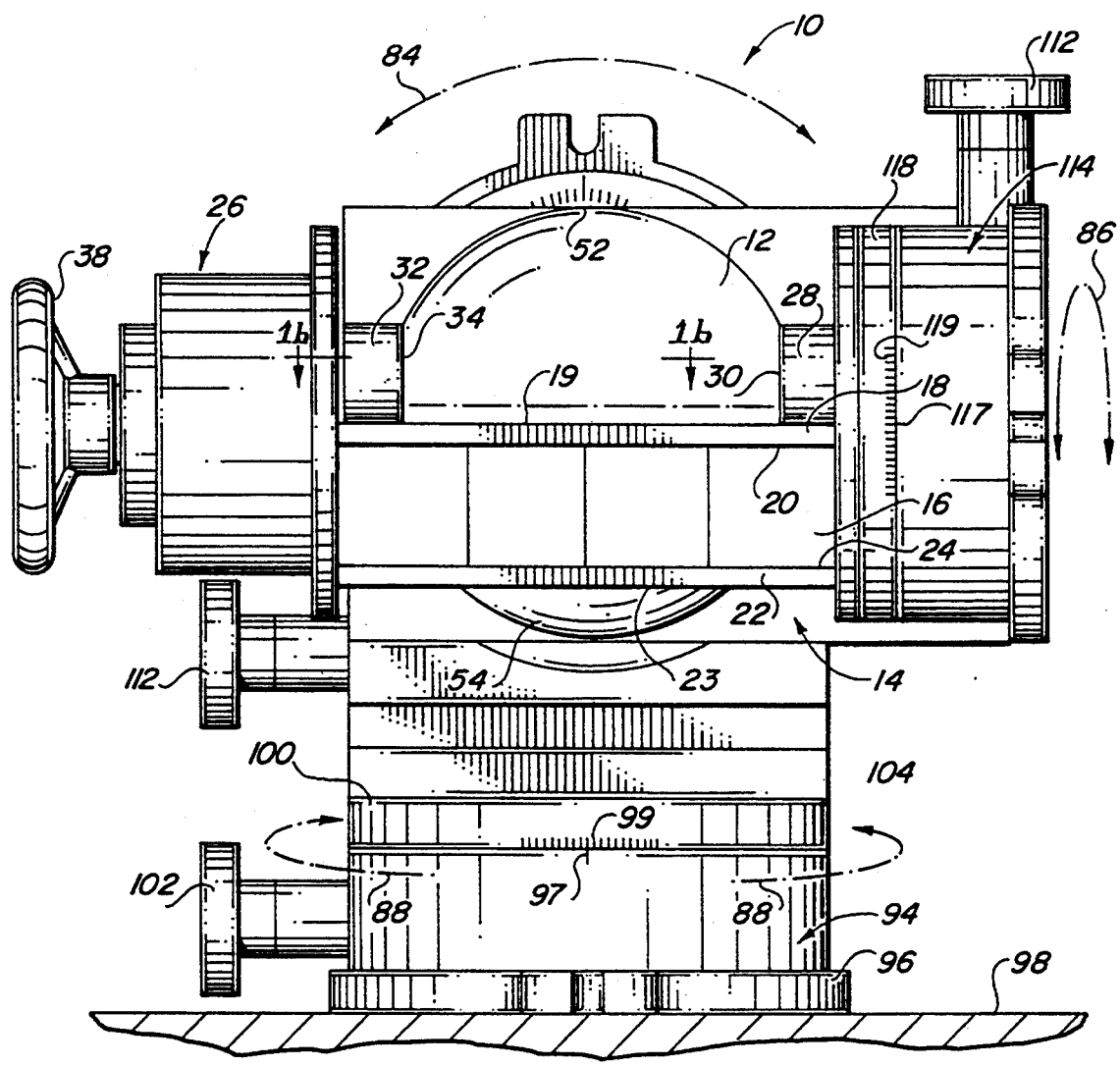
FIG. 1a is a front view of an apparatus used in the preferred embodiment of the invention illustrating a bowling ball affixed within the apparatus.
Figure 1B:
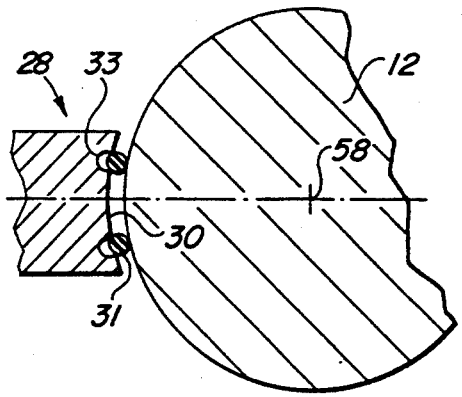
FIG. 1b is a cross sectional view of the O-ring and ball.
Figure 1C:
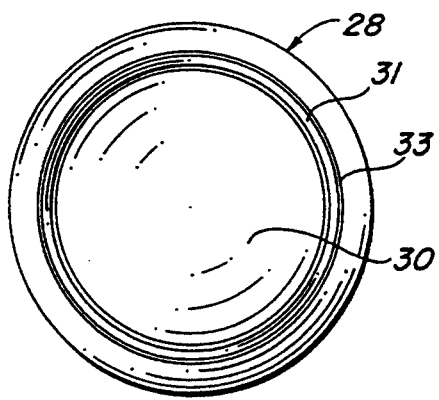
FIG. 1c shows the O-ring seated in the cradle.

A preferred embodiment of the invention is illustrated in FIG. 1 wherein an apparatus 10 for rigidly holding a bowling ball 12 and for orienting the bowling ball 12 through various angles of rotation is described. The apparatus 10 comprises a frame 14 formed by a rigid cylindrical tube To improve rigidity, a top plate 18 is affixed along a top edge 20 and a bottom plate 22 is affixed along a bottom edge 24 of the tube 16. The frame 14 takes on a circular form with a cross-section having an I-beam shape in the preferred embodiment. A vise 26 is affixed to the frame 14. The vice 26 comprises a fixed cradle 28 having a concave surface 30 for receiving the bowling ball 12. The vise 26 further comprises a keyed cradle 32 opposing the fixed cradle 28. The keyed cradle also has a concave surface 34 for receiving the bowling ball 12 and in combination with the keyed surface affixes the bowling ball 12 in a position wherein a hemisphere 36 of the bowling ball 12 lies above the top plate 18 within a top plate aperture 19 and permits access to a substantial portion of the hemisphere 36 for purposes of drilling holes into the ball 12. A bottom plate aperture 23 permits the ball 12 to pass therethrough and permits access to the ball 12 for holding the ball 12 in position while affixing the ball 12 within the frame 14. The vice 26 has a handle 38 for driving a screw assembly (not shown) for biasing the ball 12 between the keyed cradle 32 and the fixed cradle 28. In the preferred embodiment, the fixed cradle concave surface 30 has a rubber O-ring 31 affixed within an O-ring groove 33 typically used to position an O-ring for enhancing friction between the ball 12 and the surface 30 for further preventing rotation of the ball 12 during a drilling step. The keyed cradle 32 comprises a key way and key assembly (not shown) for causing the keyed cradle 32 to move toward the ball 12 without rotation of the keyed cradle 32 and for enhancing the rigidity with which the vice 26 holds the ball 12 in a fixed position within the frame 14.

Figure 2A:
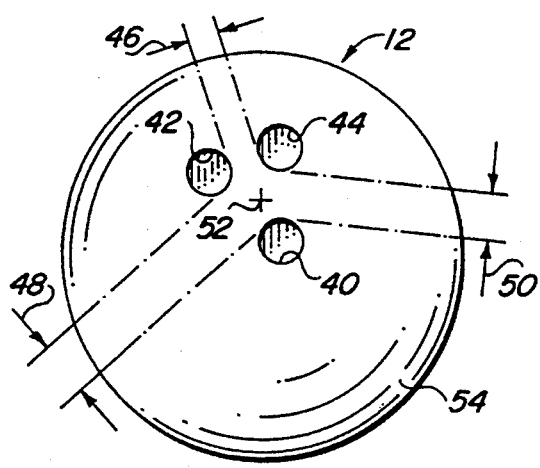
FIG. 2a is a perspective view of a bowling ball having three holes.

To further establish an understanding of the need for the invention, a brief discussion of terms describing the holes typically formed within the bowling ball 12 is in order. With reference to FIG. 2a, the bowling ball 12 may comprise two holes but will typically comprises three, a thumb hole 40, a middle finger hole 42, and a ring finger hole 44. A bridge 46 separates the finger holes 42 and 44. A middle finger span 48 and ring finger span 50 respectively separate the middle finger hole 42 and the ring finger hole 44 from the thumb hole 40. As is usually the case, a reference point 52 is placed on the ball surface 54 for use as a guide in positioning the holes.

Figure 2B:
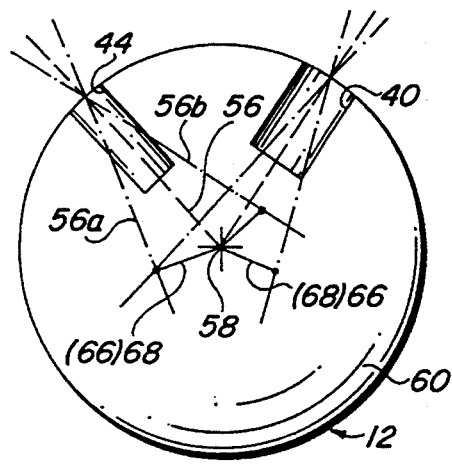
FIG. 2b is a cross-sectional view of a bowling ball illustrating a cross-sectional plane comprising a finger hole and a thumb hole.
Figure 2C:
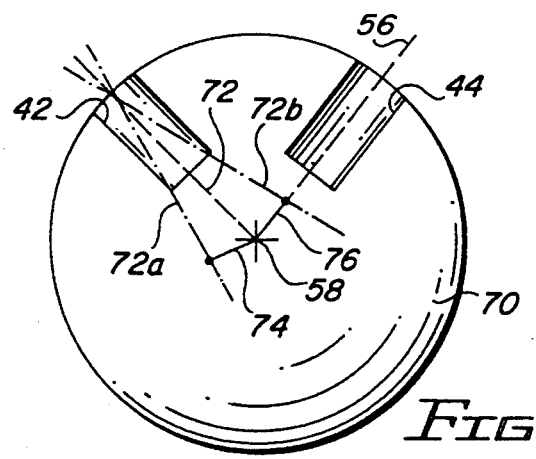
FIG. 2c is a cross-sectional view of a bowling ball illustrating a cross-sectional plane comprising a middle finger hole and a ring finger hole.
Figure 3A:
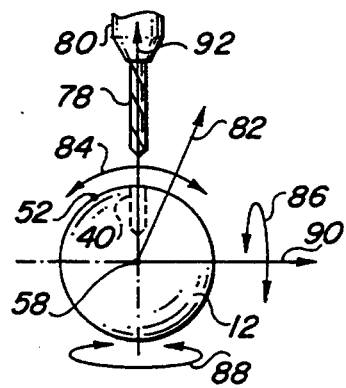
FIG. 3a is a partial functional view of a bowling ball illustrating rotational movement and displacement.
Figure 3B:
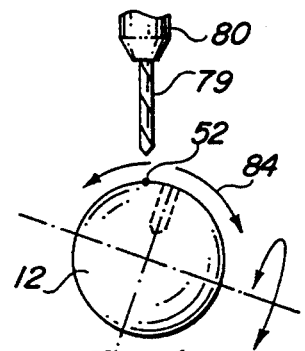
FIG. 3b through 3f are varying positional views of FIG. 3a illustrating five degrees of movement.
Figure 3C:
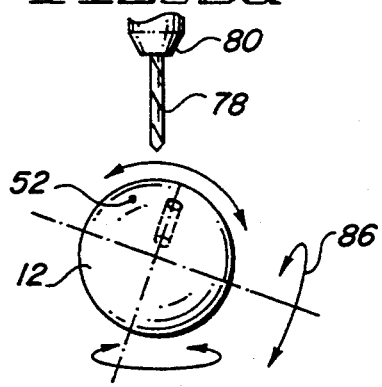
Figure 3D:
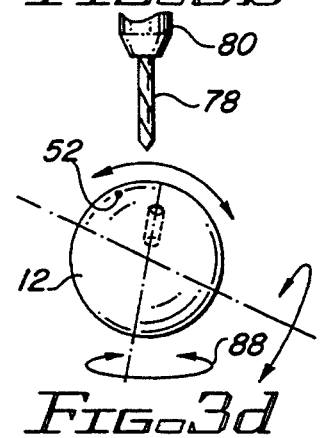
Figure 3E:
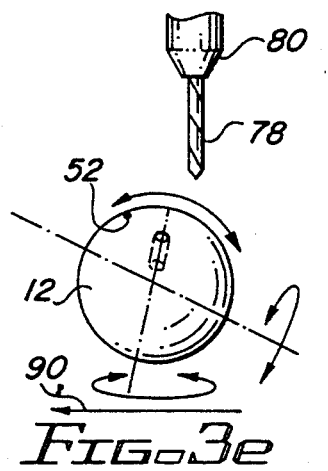
Figure 3F:
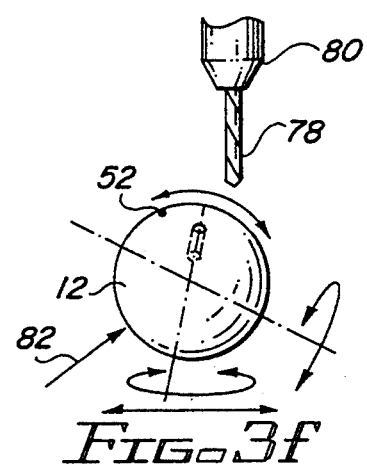

Each hole 40, 42, and 44, will be drilled using an appropriate drill bit to form the hole diameter required. In the preferred embodiment, the ball 12 is maneuvered with respect to the bit for drilling a hole having a specific pitch. Pitch, although well known as a term of art is not necessarily well known as to what it describes as is pointed out in the reference manual discussed in the background section of this specification. To emphasize by way of example and to further show a need addressed by the invention, consider the cross-sectional views of the bowling ball 12 as illustrated in FIGS. 2b and 2c. By way of example, if a hole 44 is drilled into the ball 12, and an axis 56 of the hole 44 passes through a ball center 58, the hole 44 is said to have a zero pitch. A closest distance between the ball center 58 and the hole axis 56 is zero.

With reference to FIG. 2b, showing a cross-section of the ball 12 wherein a cross-sectional plane 60 comprises a finger hole 44 and a thumb hole 40, a relationship between axes of fingers and thumb describes forward and reverse pitch. A distance between the ball center 58 and a finger hole axis 56a when the axis 56a is in a direction away from the thumb hole 40 is a reverse finger pitch 62. A distance between the ball center 58 and an axis 56b when the axis 56b is in a direction toward the thumb hole 40 is a forward finger pitch 64. With reference to the finger hole 44, the reverse thumb pitch 66 and the forward thumb pitch 68 are thus described.

Holes will also be described as having a left lateral pitch and a right lateral pitch. With reference to FIG. 2c, a cross-sectional plane 70 through the ball center 58 comprises the finger holes 42 and 44. For the middle finger 42 having an axis 72, a distance an axis 72a is away from the center 58 and to the left or away from the ring finger hole 44 is a lateral left pitch 74. A distance an axis 72b is away from the center 58 and to the right or toward the ring finger hole 44 is a lateral right pitch 76. Left and right distances from the center 58 for axes of the ring finger hole 44 and thumb hole 40 will likewise define lateral right and left pitches for these holes as well.

In the preferred embodiment of the invention, the bowling ball 12 remains affixed within the frame 14 of the apparatus 10 and the frame 14 is maneuvered for drilling holes having varying pitches, angles and shapes. By way of example, and as illustrated in FIG. 3, the following terminology is adopted for describing the movements:

TABLE 1

| MOVEMENT | MOVEMENT DEFINED | |
|---|---|---|
| | ELEMENT MOVED | TYPE MOVEMENT |
| initialize | Reference Point 52 | align bit 78 |
| Up-Down | Drill Bit 78 | Lateral (z-axis 92) |
| Left-Right | TABLE 98 | Horizontal (x-axis 90) |
| Forward-Back | TABLE 98 | Horizontal (y-axis 82) |
| Tilt | Frame 14 | x-axis rotation 86 |
| Turn | Frame 14 | y-axis rotation 84 |
| Spin | Frame 14 | z-axis rotation 88 |

As is illustrated in FIG. 3, a drill bit 78 is affixed within a chuck 80 of a drill (not shown) and aligned above the ball reference point 52 for establishing a initial position. The ball 12 is then laterally displaced and rotated to position the ball 12 with respect to the bit 78 for allowing the bit 78 to be directed along its axis for drilling a prescribed hole in the ball 12. As illustrated in FIG. 3a, the ball 12 is rotated about a y-axis 82 through a y-axis of rotation 84 as illustrated by the arrow of FIG. 2a. As described earlier and by way of example, a thumb hole 40 is drilled and will have a zero pitch if its axis passes through the ball center 58. To drill a second hole, the ball 12 will be rotated back to the reference 52 by reversing the rotation 84 where the bit 78 can be changed for drilling the next hole. An x-axis rotation 86 as illustrated in FIG. 3c positions the bit 78 over the ball surface 54 for drilling a second hole, which in our example will be the middle finger hole 42. The ring finger hole 50 is then readied for position by rotating the ball about a z-axis of rotation 88, as illustrated in FIG. 3c, being reminded that simple rotating the ball 12 without repositioning the ball center 58 thus having all hole axes passing through the center 58 results in holes having zero pitch. To provide pitch to any hole, a displacement of the ball center 58 is required. Depending on the pitch desired, the frame 14 and thus the ball is displaced along the y-axis 82 an x-axis 90 to provide the forward or reverse and left or right pitch desired as illustrated in FIGS. 3e and 3f. In the preferred embodiment, movement along a z-axis 92 is completed by advancing the rotating drill bit 78 toward and away from the ball 12.

In the preferred embodiment of the invention, the bit 78 used is a spiral-fluted indexable drill having heavy duty inserts for increased accuracy and feed rates. The bit 78 comprises a side cutting edge for providing milling capability unlike a standard drill which will drift when entering a round surface such as a bowling ball 12 or when boring a hole side when providing oval shaped holes.

Typically in the art, a bowling ball to be drilled will have to be repositioned within its clamping device in order to provide the range of hole shapes, angles and pitches requested by a bowler. Some devices as discussed in the background section of this specification will hold the ball clamped through many drilling steps but are somewhat limited especially for the combination of holes requested by a skilled and professional bowler. Repeating a set of measurements or modifying one measurement while repeating the balance of measurements is then an object of the invention. Once the ball 12 has been affixed within the frame 14 as described, it need not be removed until the drilling steps are completed. Again with reference to FIG. 1, to accomplish this, the apparatus 10 further comprises three revolving platforms.

Figure 4:
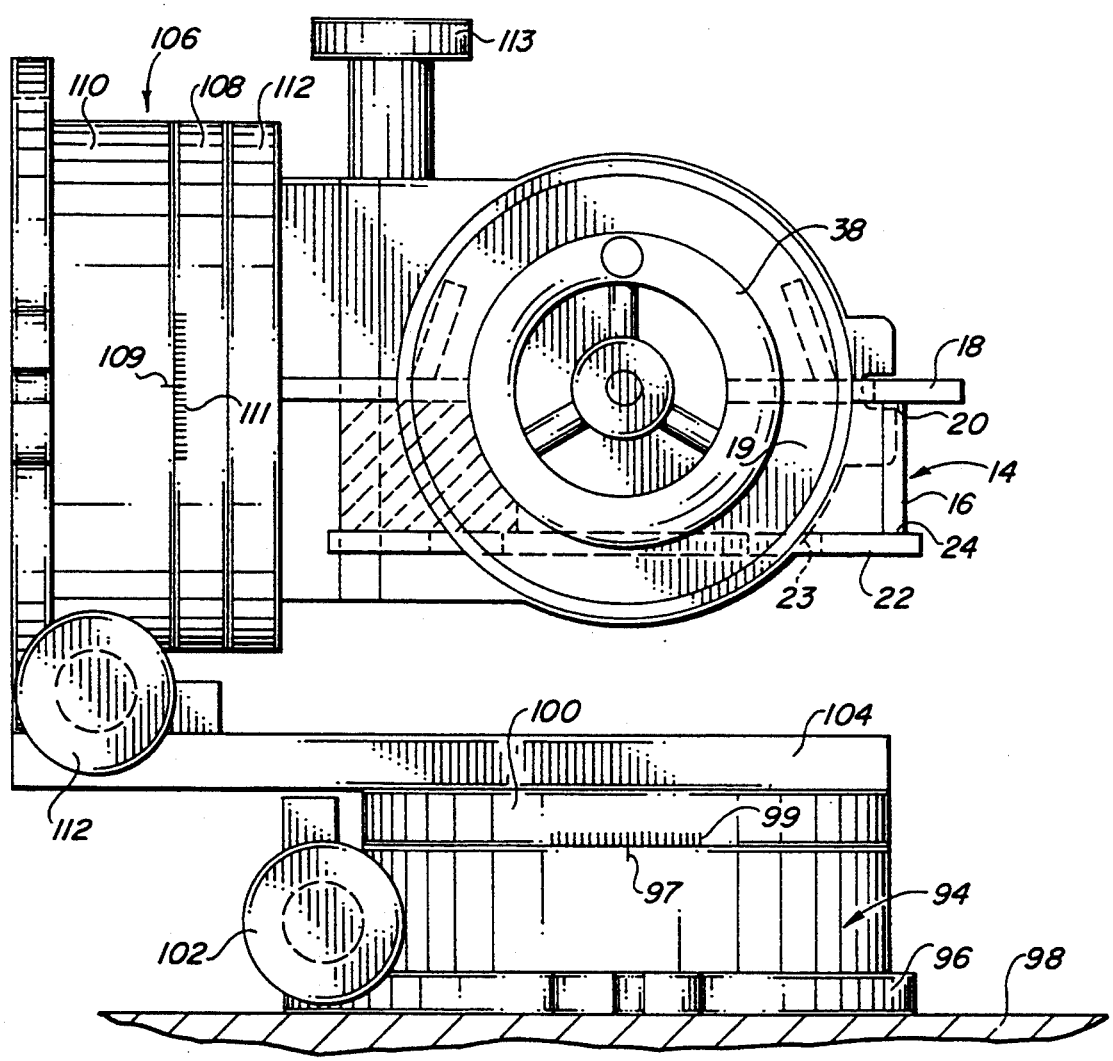
FIG. 4 is a side view of the apparatus used in the preferred embodiment and shown in FIG. 1.

Rotation about the z-axis 88 is accomplished using a rotational device 94 having a base 96 rigidly affixed to a table 98. In the preferred embodiment, the table 98 is that of a milling machine (not shown) wherein the milling machine comprises means for table displacement along the x-axis 90 and y-axis 82. The platform base 96 is rotatably affixed to a revolving platform 100. The platform 100 is rotated using a handle 102 which drives rotating gears (not shown) causing z-axis rotation 88 of the platform 100 referred to in this specification as spinning. The degree of spin is measured by an index 97 placed on the base 96 moved along a scale 99 placed on the revolving platform 100 communicating with the index 97. The z-axis platform 100 is rigidly affixed to a bracket 14 as shown in FIG. 4 illustrating a side view of the apparatus 10. The bracket 14 comprises an L-shaped cross-section wherein one leg of the bracket 104 is affixed to the z-axis platform 100 and the other leg of the bracket 14 is affixed to a y-axis rotational device 16 placing the y-axis rotational device 106 at a right angle to the z-axis rotational device 94. As with the z-axis device 94, the y-axis device 16 has a revolving platform 108 rotatably affixed to a base 110 along with a handle 112 communicating with gears for rotating the platform 108. This y-axis base 110 is rigidly affixed to the bracket 104. As discussed, an index 109 communicates with a scale 111 for measuring a turn as described in this specification. The y-axis revolving platform 108 is rigidly affixed to a second L-shaped bracket 112 on one leg of the bracket 112. The other leg is rigidly affixed in a similar manner as herein described to an x-axis rotational device 114. The x-axis rotational device 114 is rigidly affixed at a right angle to the y-axis device 106. As in the devices 94 and 106, the x-axis revolving device 114 comprises a base 116 rigidly affixed to the second L-shaped bracket 112 and a revolving platform 118 rotatably affixed to the base 116. Again, as with the z-axis device 94, the x-axis device 114 has a handle 113 communicating with gears for rotating the platform 180. An index 117 communicates with a scale 119 for measuring a tilt as described in this specification and as illustrated in FIG. 1. Again with reference to FIG. 1, the vise 26 is affixed to the x-axis device 114. With the arrangement of the devices 94, 106, and 114, z-axis rotation 88, y-axis rotation 84 and x-axis rotation 86 are achieved.

In the preferred embodiment of the invention, the apparatus 10 provides the rotational movements, rotation about the x-axis or tilt, rotation about the y-axis or turn, and rotation about the z-axis, spin as discussed. The table 98 of the mulling machine provides movement along the x-axis 90 or left and right, and movement along the y-axis 82 or forward and back. The drill bit moves along the z-axis 92 or up and down.

Software includes trigonometric algorithms that convert the geometry of the holes 40, 42, and 44 to digitized movements of the ball 12 for drilling steps to meet predetermined hand measurements. A worker positions the ball 12 within the frame 14 as herein described and aligns the drill bit 78 over the ball reference point 52. Computer output provides digital movements for each hole to be drilled. In the preferred embodiment, digital encoders are affixed to the frame 14 and table 98 rotating and displacement controls for providing a readout from the encoder that matches the digital output from the computer output. In the preferred embodiment, input to the computer comprises bowler hand measurements comprising Ring Finger, Middle Finger, and Thumb Diameters, Lateral Pitch (Left or Right), and Forward or Reverse Pitch. In addition, the Bridge 46, Middle Finger to Thumb Span 48, Ring Finger to Thumb Span 50 distances and whether the bowler uses his right hand or left hand are provided as computer input. The computer provides x-axis rotation 86 and y-axis rotation 84, and x-axis 90 and y-axis 82 displacement movements necessary to provide middle finger 42, ring finger 44 and thumb 40 holes having proper pitch and position relative to the ball reference point 52 in a digitized format for matching with a format for an output of the digital encoders.

Figure 5A:
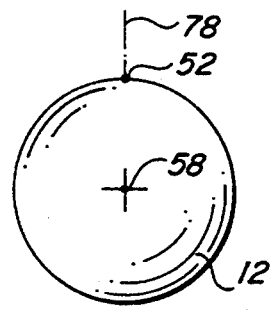
FIGS. 5a through 5d illustrate a well known method of drilling a hole into a bowling ball wherein the hole is to have a predetermined pitch.
Figure 5B:
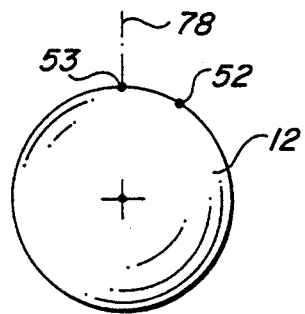
Figure 5C:
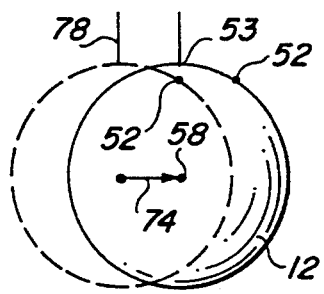
Figure 5D:
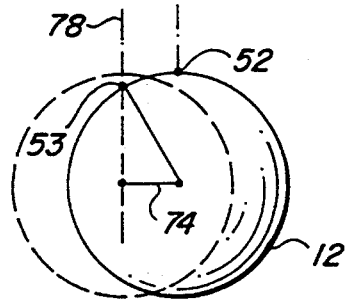
Figure 6A:
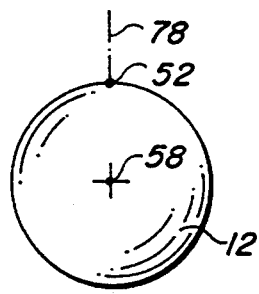
FIGS. 6a through 6c illustrate a prior art hole drilling method for providing pitch to a hole to be drilled into the ball.
Figure 6B:
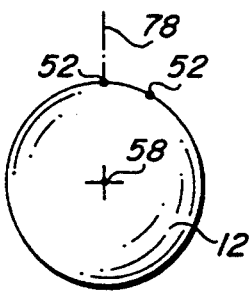
Figure 6C:
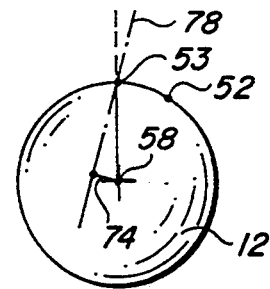

Calculations include positioning holes and providing pitches to each hole as desired. To better appreciate the invention, first consider a known bowling ball drilling method, as illustrated in FIG. 5a through 5d. With reference to FIG. 5a, a bowling ball is clamped in a cradle (not shown) wherein a drill bit 78 affixed within a chuck is aligned with the reference point 52 typically affixed to the ball surface by a ball manufacturer. The cradle is configured such that the ball 12 may be rotated about the ball center 58 by releasing the clamped ball and manually rotating the ball 12 for positioning the bit 78 above a marked position 53 for drilling a desired hole, as illustrated in FIG. 5b. If the hole to be drilled is to have a pitch, for example a left lateral pitch 74, the clamp is displaced by the amount of the pitch 74 requested as illustrated in FIG. 5c. The ball 12 is then released from the clamp and rotated until the bit 78 is positioned above the marked hole position 53 as illustrated in FIG. 5d. A template is typically used for marking finger and thumb locations on the ball surface. The ball 12 is again clamped and a hole is drilled. In another known method as described earlier in the Background section of this specification, a ball 12 is clamped and the bit 78 is aligned over the ball reference point 52 as is illustrated in FIG. 6a. The ball 12 is rotated while remaining affixed within a fixture (not shown) until the bit 78 is positioned above the designated location 53 as is illustrated in FIG. 6b. To provide a left lateral pitch 74, the bit 78 is rotated using predetermined indicator marking on the fixture as illustrated in FIG. 6c, Error is introduced whenever a ball 12 is released from its fixed position. Although known and unwanted, this error has been accepted within the art. In addition, displacing the ball 12 to provide a pitch 74 and rotating the ball 12 to then account for a proper hole location 53 on the surface of the ball without accounting for ball movements introduces even more error. For the prior art, correcting for this error has not been addressed.

Figure 7:
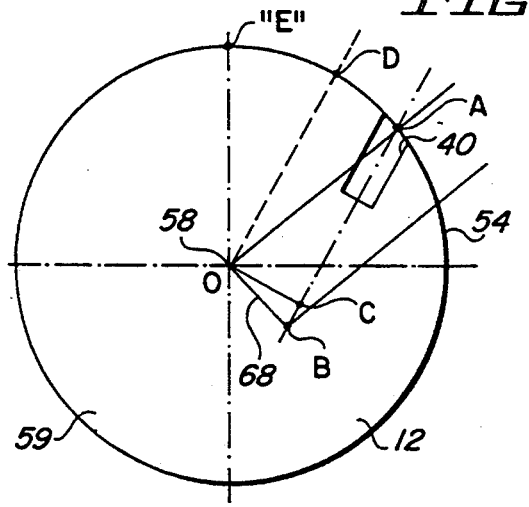
FIG. 7 is a partial cross-section of a bowling ball illustrating a preferred method of the invention for accurately determining the orientation of a drill bit for drilling a hole having a desired pitch.

The invention herein described provides the apparatus 10 and the method through its computer calculations to avoid such error. By way of example and with reference to FIG. 7, consider a desired thumb hole 40 having a reverse pitch 68 as is typically requested by a bowler. In the prior art, the ball 12 would be rotated about its center 58 or point "O" as illustrated in FIG. 7, to a marked template point "A" where the hole 40 is to be drilled. The ball would then be displaced by a distance equal to the required pitch 68 and then rotated again until the point "A" is aligned with the bit as described earlier. Error is introduced when the ball 12 is rotated about its center 58 as has been the case in the prior art. This error is avoided in the invention being described herein.

By way of example, consider drilling a thumb hole having a reverse pitch. Again with reference to FIG. 7, based on input data described earlier, calculations are first made in a plane 59 passing through the ball center 58 that includes the hole center 53 on the ball surface 54 also indicated by point "A" in FIG. 7. Such a plane 59 is the cross-sectional view illustrated in FIG. 7. If there were to be no left or right lateral pitch, the axis of the hole would lie in this plane 59. A half arc distance between the thumb hole 40 and a finger hole is calculated and a point "E" is determined from which further calculations are to be made. Point "E" represents a half span point in the calculation. Distance AE is thus determined. A point "D" is determined where a line passing through the ball center 58 (point "O") and "D" is parallel to the desired axis of the thumb hole 40 to be drilled. The next step in the calculation is to determine a Distance OC that the ball is to be displaced in order to align a drill bit (not shown in FIG. 7) in a position to bore out the desired hole.

Distance AO is the ball radius and its dimension calculated from the measured diameter. OB is known for it represents the desired reverse pitch 68. By definition of pitch, it is known that OB is perpendicular to OA. Triangle AOB is a right triangle. Distance OC is being sought and is the actual displacement of the ball center 58. Angle OCA is therefore a right angle and Triangle OCB a right triangle. From Triangle AOB, Angle OBA is determined. In Triangle OCB, Distance OC is then determined. The ball 12 is thus rotated from the half span point "E" to point "D" and then displaced by a Distance OC to provide the proper desired pitch.

In an example of measurements and drilling procedures, it has been found that a 0.50 inch pitch requires a 0.496 inch displacement. A four inch pitch requires only about a three inch displacement. In addition, accounting for ball diameter in the calculations has shown that the ball diameter variations permitted by the manufacturers and allowed by bowling authorities can result in approximately a one sixteenth inch error when comparing a permitted diameter of 8.595 inches to a permitted diameter of 8.500 inches for a typical four inch to five inch span. Such an error is easily felt by the bowler.

In the above thumb hole 40 example, if there was to be a requirement for the thumb hole 40 to have a left or right lateral pitch as well as the reverse pitch 68 illustrated, similar calculations would be made in a second plane. The second plane would be perpendicular to the plane 59 of FIG. 7 and include the point "A". Similar calculations are then completed for each hole. In the preferred embodiment of the invention, calculations are made using well known spread sheet packaged software having formula translation capability. A sample software calculation is presented in the chart of FIG. 8 where the calculation is completed for a right handed bowler having the "given information" presented in the chart.

Figure 10:
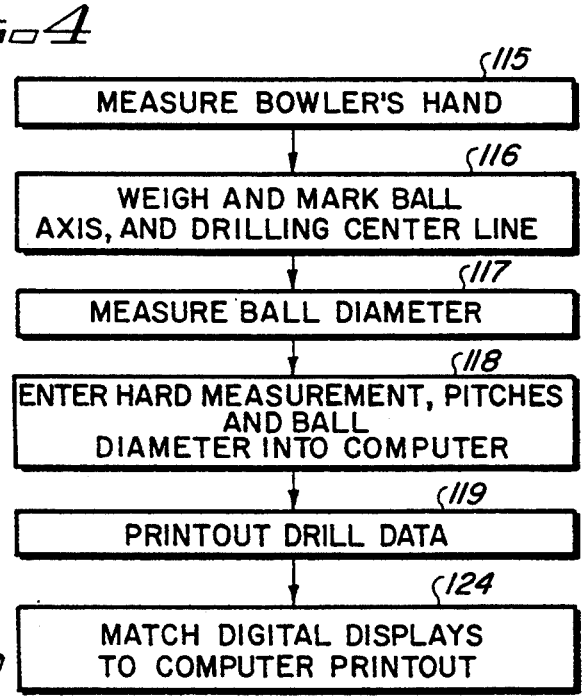
FIG. 10 is a sample computer output illustrating the format provided in the preferred embodiment of the invention for use in providing the method steps of the invention.

In the total drilling procedure, and with reference to FIG. 8, a bowler's hand is measured using known skills. The ball 12 is weighed and an axis passing through ball center 58 is identified by marking the ball 116. The ball diameter is measured 117 and the measured data entered into the computer 118. A computer printout 119 is provided. A sample printout is illustrated in FIG. 10 wherein rotational 120 and linear 122 movements are displayed. These movements 120 and 122 correspond to the movements of the frame 14 and table 98 described earlier in this detailed description. As illustrated in FIG. 10, movements for the middle finger, ring finger and thumb are provided. The calculated movements are matched 124 with the frame 14 and table 98 movements displayed on the digital encoders making it a drilling process that requires little experience to perform and thus meets an objective of the invention as described.

If an oval hole is to be drilled, the milling drill bit described earlier is used in order to eliminate tapering of the hole as experienced when using conventional drill bits that cut only at bottom center of the bit. The milling drilling tool insures parallel successive enlargements of the original hole to create a true oval with regards to pitch and size due to its side cutting ability. In the situation where the oval hole is to be rotated about the z-axis 88, the hole is drilled prior to rotation. The z-axis 88 is then rotated to the desired angle and the drill is then moved utilizing the tables X and Y axis until the drill milling tool moves freely into and out of the original circular hole. The precision of the frame 12 and table 98 movements is relied upon to preserve accuracy especially since the digital displays remain in tack identifying precise positioning. The cutting tool bit is then indexed along a major oval axis both sides of center to form the required oval.

In the foregoing description, certain terms have been used for brevity, clearness and understanding, but no unnecessary limitations are to be implied therefrom beyond the requirements of the prior art. Such terms are used for descriptive purposes herein and are intended to be broadly construed. Moreover, the embodiment of the apparatus illustrated and method of use described herein are by way of example, and the scope of the invention is not limited to the exact details disclosed.

While a specific embodiment of the invention has been described in detail herein above, it is to be understood that various modifications may be made from the specific details described herein above without departing from the spirit and scope of the invention as set forth in the appended claims.

What is claimed is:

1. An apparatus for positioning a bowling ball for drilling thumb and finger holes in the bowling ball, the apparatus comprising:

a frame having an aperture for loosely receiving a bowling ball, the frame lying below an imaginary horizontal plane passing through a ball center, the ball positioned for being drilled;

means for rigidly affixing the bowling ball within the frame aperture, the affixing means providing access to a substantial portion of a hemisphere of the ball;

means for rotating the frame, the rotating means having three degrees of freedom of rotational movement, wherein the rotating means provides for rotation of the frame about an x-axis, a y-axis and a z-axis, the axes perpendicular to each other and intersecting at the bowling ball center;

means for providing linear frame movements along each of the axes, the movements for establishing frame positions for drilling thumb and finger holes for a predetermined relationship;

means for measuring each frame movements, the movements for establishing frame positions for drilling thumb and finger holes for a predetermined relationship; and means for controlling the measured frame movements for drilling finger and thumb holes.

2. The apparatus as recited in claim 1, wherein the frame further comprises:

a tube dimensioned to freely receive the bowling ball, the tube having a top edge and a bottom edge;

a top plate affixed to the tube top edge, the top plate having an aperture for loosely receiving the bowling ball; and a bottom plate affixed to the tube bottom edge, the bottom plate having an aperture for providing access to the bowling ball affixed within the frame.

3. The apparatus as recited in claim 2, wherein the tube comprises a cylindrical tube and the plate apertures are circular, the centers of the apertures aligned proximate the cylindrical tube axis.

4. The apparatus as recited in claim 1, wherein the ball affixing means comprises:

a fixed cradle dimensioned for receiving the bowling ball along an axis through the center of the bowling ball;

a keyed cradle opposing the fixed cradle, the keyed cradle receiving the bowling ball along an axis through the center of the bowling ball;

a vise having a first jaw and a second jaw, the jaws dimensioned for receiving cradles, the first jaw affixed to the keyed cradle, the second jaw affixed to the fixed cradle, the vise affixed to the frame; and means for biasing the bowling ball between the keyed cradle and the fixed cradle, the biasing means providing a linear movement of the keyed cradle along an axis through the cradles, the axis passing through the bowling ball center, the biasing means sufficient to rigidly hold the bowling ball within the frame aperture.

5. The apparatus as recited in claim 4, further comprising means for enhancing friction between the cradles and the bowling ball, the friction means affixed to surfaces of the cradle contacting the ball.

6. The apparatus as recited in claim 1, wherein the measuring means comprises digitizers for indicating measured movements of the frame and table with respect to a reference position on the bowling ball.

7. A system for drilling thumb and finger holes in a bowling ball, the system comprising:

a frame having an aperture for loosely receiving a bowling ball, the frame lying below an imaginary horizontal plane passing through a ball center, the ball positioned for being drilled;

means for rigidly affixing the bowling ball within the frame aperture for providing access to a substantial portion of a hemisphere of the ball, the portion sufficient for receiving a drill bit for drilling an arrangement of finger and thumb holes;

means for rotating the frame, the rotation having three degrees of freedom of rotational movement, wherein the rotating means provides for rotation of the frame about an x-axis, a y-axis and a z-axis, the axes perpendicular to each other and intersecting at the bowling ball center;

means for providing linear frame movements along each of the axes, the movements for establishing frame positions for drilling thumb and finger holes for a predetermined relationship;

means for measuring each frame movement, the movements for establishing frame positions for drilling thumb and finger holes for the predetermined relationship;

a table having two of the linear movements, each movement in a plane parallel to a surface of the table;

means for mounting the apparatus to the table surface; and means for drilling a hole into the bowling ball along a fixed axis, the fixed axis perpendicular to the table surface.

8. The system as recited in claim 7, further comprising:

means for providing directed rotational movements to the rotating means;

means for providing directed linear movements to the table moving means; and means for providing directed linear movements to the drilling means, wherein the directed movements are correlated with bowler hand and ball measurements, the movements for providing predetermined holes drilled in the bowling ball accommodating the bowler hand measurements.

* * * * *